(12) United States Patent
Blake et al.

(10) Patent No.: US 7,257,272 B2
(45) Date of Patent: Aug. 14, 2007

(54) VIRTUAL IMAGE GENERATION

(75) Inventors: Andrew Blake, Stapleford (GB); Antonio Criminisi, Cambourne (GB)

(73) Assignee: Microsoft Corporation, Redmond, WA (US)

( * ) Notice: Subject to any disclaimer, the term of this patent is extended or adjusted under 35 U.S.C. 154(b) by 715 days.

(21) Appl. No.: 10/826,981

(22) Filed: Apr. 16, 2004

(65) Prior Publication Data

US 2005/0232510 A1    Oct. 20, 2005

(51) Int. Cl.
   *G06K 9/40*      (2006.01)
   *H04N 1/407*     (2006.01)
   *H04N 1/409*     (2006.01)
   *G06K 15/00*    (2006.01)

(52) U.S. Cl. ..................... 382/275; 358/3.26
(58) Field of Classification Search ................ 382/275, 382/254, 260–265, 286, 294; 348/241–252; 345/611; 358/3.26
See application file for complete search history.

(56) References Cited

U.S. PATENT DOCUMENTS

| | | | |
|---|---|---|---|
| 5,359,362 A | 10/1994 | Lewis et al. | |
| 5,917,937 A | 6/1999 | Szeliski et al. | |
| 5,986,668 A | 11/1999 | Szeliski et al. | |
| 5,987,164 A | 11/1999 | Szeliski et al. | |
| 6,009,188 A | 12/1999 | Cohen et al. | |
| 6,009,190 A | 12/1999 | Szeliski et al. | |
| 6,018,349 A | 1/2000 | Szeliski et al. | |
| 6,023,523 A | 2/2000 | Cohen et al. | |
| 6,028,955 A | 2/2000 | Cohen et al. | |
| 6,044,181 A | 3/2000 | Szeliski et al. | |
| 6,072,496 A | 6/2000 | Guenter et al. | |
| 6,084,592 A | 7/2000 | Shum et al. | |
| 6,097,854 A | 8/2000 | Szeliski et al. | |
| 6,137,491 A | 10/2000 | Szeliski | |
| 6,157,747 A | 12/2000 | Szeliski et al. | |
| 6,222,937 B1 | 4/2001 | Cohen et al. | |
| 6,246,412 B1 | 6/2001 | Shum et al. | |
| 6,271,855 B1 | 8/2001 | Shum et al. | |
| 6,301,370 B1 * | 10/2001 | Steffens et al. | ............. 382/103 |
| 6,304,288 B1 | 10/2001 | Hamagishi | |
| 6,320,978 B1 | 11/2001 | Szeliski et al. | |
| 6,348,918 B1 | 2/2002 | Szeliski et al. | |
| 6,476,803 B1 | 11/2002 | Zhang et al. | |
| 6,487,304 B1 | 11/2002 | Szeliski | |

(Continued)

OTHER PUBLICATIONS

Basu, Sumit, Essa, Irfan, Pentland, Alex; "Motion Regularization for Model-Based Head Tracking." In Proceedings of International Conference on Pattern Recognition, Wien, Austria, 1996 IEEE, pp. 611-616.

(Continued)

*Primary Examiner*—Yon J. Couso (57) ABSTRACT

Artifacts are detected in a cyclopean virtual image generated from stereo images. A disparity map is generated from the stereo images. Individual projected images are determined based on the disparity map and the corresponding stereo images. A difference map is computed between the individual projected images to indicate the artifacts. A source patch in the virtual image is defined relative to an artifact. A replacement target patch is generated using a split-patch search technique as a composite of a background exemplar patch and a foreground exemplar patch. Each exemplar patch may be identified from an image patch selected from at least one of the stereo images. The source patch of the virtual image is replaced by the replacement target patch to correct the detected artifact.

23 Claims, 11 Drawing Sheets

U.S. PATENT DOCUMENTS

| | | | |
|---|---|---|---|
| 6,606,404 B1 | 8/2003 | Zhang et al. | |
| 6,608,923 B1 | 8/2003 | Zhang et al. | |
| 6,611,268 B1 | 8/2003 | Szeliski et al. | |
| 6,639,596 B1 | 10/2003 | Shum et al. | |
| 6,642,924 B1 | 11/2003 | Kang et al. | |
| 6,668,080 B1 | 12/2003 | Torr et al. | |
| 6,674,877 B1 | 1/2004 | Jojic et al. | |
| 6,806,898 B1 * | 10/2004 | Toyama et al. | 348/14.16 |
| 2005/0129305 A1 * | 6/2005 | Chen et al. | 382/154 |

OTHER PUBLICATIONS

Belhumeur, Peter N.; Mumford, David "A Bayesian Treatment of the Stereo Correspondence Problem Using Half-Occluded Regions" IEEE Conference on Computer Vision and Pattern Recognition, 1992, 8pgs.

Black, Michael J., Yacoob, Yaser; "Tracking and Recognizing Rigid and Non-Rigid Facial Motions Using Local Parametric Models of Image Motion"; IEEE Proceedings of International Conference on Computer Vision, Cambridge, MA, 1995, pp. 374-381.

Bobick, Aaron F., Intille, Stephen S.; "Large Occlusion Stereo"; HCV 1999, pp. 1-25.

Chen, Shenchang Eric, Williams, Lance; "View Interpolation for Image Synthesis"; SIGGRAPH, 1993, pp. 1-7.

Choi, Chang Seok, Aizawa, Kiyoharu, Harashima, Hiroshi, Takebe, Tsuyoshi; "Analysis and Synthesis of Facial Image Sequences in Model-Based Image Coding" IEEE Transaction on Circuits and Systems for Video Technology v. 4, n 3 Jun. 1994, pp. 257-275.

Cox, Ingemar J., Hingorani, Sunita L., Rao, Satish B., Maggs, Bruce M.; "A Maximum Likelihood Stereo Algorithm" Computer vision and Image Understanding, May 1996, pp. 542-567 (1-47).

Darrell, Trevor, Baback, Moghaddam, Pentland, Alex P.; "Active Face Tracking and Pose Estimation in an Interactive Room" IEEE Computer Vision and Pattern Recognition, 1996, pp. 67-72 (1-16).

DeCarlo, Douglas, Metaxes, Dimitris; "Optical Flow Constraints on Deformable Models with Applications to Face Tracking" International Journal of computer Vision, 2000, pp. 99-127 (1-42).

Gemmell, Jim, Toyama, Kentaro, Zitnick, C. Lawrence, Kang, Thomas, Seitz, Steven; "Gaze Awareness for Video-Conferencing: A Software Approach" Oct.-Dec. 2000, pp. 26-35.

Horprasert, Thanarat, Yacoob, Yaser, Davis, Larry S.; "Computing 3-D Head Orientation From a Monocular Image Sequence"; Interantional Conference Automatic Face and Gesture Recognition, 1996, pp. 242-247.

Ishikawa, Hiroshi, Geiger, Davi; "Occlusions, Discontinuities, and Epipolar Lines in Stereo" The Fifth European Conference on Computer Vision (ECCV '98) Jun. 1998, Germany pp. 1-14.

Kolmogorov, Vladimir, Zabih, Ramin; "Multi-Camera Scene Reconstruction via Graph Cuts"; Proc. Europ. Conf. Computer Vision, Copenhagen, Denmark, May 2002, pp. 1-16.

Li, Haibo, Roivainen, Pertti, Forchheimer, Robert; "3-D Motion Estimation in Model-Based Facial Image Coding" IEEE Transactions on Pattern Analysis and Machine Intelligence, v. 15, n 6, Jun. 1993, pp. 545-555.

Liu, Zicheng, Zhang, Zhengyou, Jacobs, Chuck, Cohen, Michael; "Rapid Modeling of Animated Faces from Video" Proceedings of the Fourth IEEE International Conference on Automatic Face and Gesture Recognition Feb. 2000, pp. 58-67.

Loop, Charles, Zhang, Zhengyou; "Computing Rectifying Homographies for Stereo Vision" Technical Report MSR-TR-99-21, 14 pgs.

Lu, Le, Zhang, Zhengyou, Shum, Heung-Yeung, Liu, Zicheng, Chen, Hong; "Model and Exemplar-Based Robust Head Pose Tracking Under Occlusion and Varying Expression" IEEE Computer Soc. Conf. on Computer Vision & Pattern Recog., Dec. 2001, Hawaii, USA, pp. 1-8.

Newman, Rhys, Matsumoto, Yoshio, Rougeaux, Sebastien, Zelinsky, Alexander; "Real-Time Stereo Tracking for Head Pose and Gaze Estimation" IEEE 2000 pp. 122-128.

Ohta, Yuichi, Kanade, Takeo; "Stereo by Intra-and Inter-Scanline Search Using Dynamic Programming" IEEE 1985, 16 pgs.

Roy, Sebastien, Cox, Ingemar J.; "A Maximum-Flow Formulation of the N-Camera Stereo Correspondence Problem" IEEE Proc. of Int. Conference on Computer Vision, Bombai, Jan. 1998, pp. 492-499.

Scharstein, Daniel, Szeliski, Richard, Zabih, Ramin; "A Taxonomy and Evaluation of Dense Two-Frame Stereo Correspondence Algorithms"; International Journal of Computer Vision, 2002, 10pgs.

Scharstein, Daniel, "Stereo Vision for View Synthesis" IEEE Computer Society Conference on Computer Vision and Pattern Recognition, San Francisco, CA, Jun. 1996 pp. 852-858.

Shi, Jianbo, Tomasi, Carlo; "Good Features to Track"; IEEE Conference on Computer Vision and Pattern Recognition, Seattle WA, Jun. 1994, 7pgs.

Sun, Jian, Shum, Heung-Yeung, Zheng, Nan-Ning; "Stereo Matching Using Belief Propagation" ECCV 2002, pp. 510-524.

Szeliski, Richard; "Prediction Error as a Quality Metric for Motion and Stereo" Vision Technology Group Microsoft Research, Proceeding of the International Conference on Computer Vision, vol. 2, Corfu, Greece, 1999, 8pgs.

Vetter, Thomas "Synthesis of Novel Views From a Single Face Image" Max-Planck-Institut, Germany, Technical Report No. 26, Feb. 1996, pp. 1-13.

Yang, Ruigang, Zhang, Zhengyou; "Eye Gaze Correction with Stereovision for Video-Teleconferencing" Proceedings from the European Conference of Computer Vision, vol. 2, Copenhagen, Denmark May 2002, pp. 479-494.

Zhang, Zhengyou, Liu, Zicheng, Adler, Dennis, Cohen, Michael F., Hanson, Erik, Shan, Ying; "Robust and Rapid Generation of Animated Faces from Video Images: A Model-Based Modeling Approach" Technical Report MSR-TR-2001-101 pp. 1-30.

Birchfield, S. Tomasi, C.; "A Pixel Dissimilarity Measure that is insensitive to Image Sampling" IEEE Transactions on Pattern Analysis and Machine Intelligence 4(20) pp. 40-406, Mar. 1998.

Broadhurst, A. & Cipolla, R.; "A statistical Consistency Check for the Space Carving Algorithm" In Proceedings of ICCV 2001, 10 pages.

Chuang, Y.-Y., Curless, B., Salesin, D. H., Szeliski, R.; "A Bayesian Approach to Digital Matting" in Proceedings of CVPR 2001, 8 pages.

Criminisi, A., Perez, P., Toyama, K.; "Object Removal by Exemplar-Based Inpainting" In Proceedings of CVPR, Madison, WI Jun. 2003, 8 pages.

Criminisi, A., Shotton, J., Blake, A., Torr, P.H.S.; "Gaze Manipulation for One-to-One Teleconferencing" In Proceedings of ICCV, Nice, Oct. 2003, 8 pages.

Efros, A. A., Leung, T. K.; "Texture Synthesis by non-prametric Sampling" In Proceedings of ICCV, Sep. 1999, pp. 1039-1046.

Fitzgibbon, A., Wexler, Y., Zisserman, A.; "Image-based rendering Using Image-based priors" in Proceedings of ICCV, Nice, Oct. 2003, 8 pages.

Harrison, P.; "A Non-Hierarchical Procedure for Re-Synthesis of Complex Textures" in Proceedings of the International Conference Central Europe Computer Graphics, Vis. and Comp. Vision, Plzen, Czech Republic, Feb. 2001, 16 pgs.

Hertzmann, A., Jacobs. C. E., Oliver, N., Curless, B., Salesin, D. H.; "Image Analogies" in Proceedings of ACM SIGGRAPH, 2001, 14 pages.

Hirschmuller, H.; "Improvements in Real-Time Correlation-Based Stereo Vision" Proceedings of IEEE Workshop on Stereo and Multi-Baseline Vision, Hawaii, Dec. 2001 pp. 141-148.

Koch, R.; "3-D Surface Reconstruction from Stereoscopic Image Sequences" in Proceedings of ICCV 1995, pp. 109-114.

Kolmogorov, V., Zabih, R.; "Computing Visual Correspondence with Occlusions using Graph Cuts" in Proceedings of ICCV 2001 pp. 508-515.

Kutulakos, K. N., Seitz, S. M.; "A Theory of Shape by Space Carving" Technical Report CSTR 692, University of Rochester, 1998, 19 pages.

Scharstein, D.; "View Synthesis Using Stereo Vision" Cornell University Dissertation Jan. 1997, 196 pages.

Szeliski, R., Golland, P.; "Stereo Matching with Transparency and Matting" IJCV 1998, 17 pages.

Wexler, Y., Fitzgibbon, A., Zisserman, A.; "Bayesian Estimation of Layers from Multiple Images" in Proceedings of ECCV, Copenhagen 2002, 15 pages.

Bornard, R.; Lecan, E.; Laborelli, L., Chenot, J.-H.; "Missing Data Correction in Still Images and Image Sequences" ACM Multimedia Dec. 2002, pp. 355-361.

* cited by examiner

VIRTUAL IMAGE GENERATION

RELATED APPLICATIONS

This application is related to U.S. Pat. No. 10/763,453, entitled "Virtual Camera Translation" and filed on Jan. 23, 2004, which is incorporated herein by reference for all that it discloses and teaches.

This application is also related to U.S. patent application Ser. No. 10/826,963, entitled "Virtual Image Artifact Detection" and filed on Apr. 16, 2004.

TECHNICAL FIELD

The invention relates generally to digital image processing, and more particularly to virtual image generation.

BACKGROUND

Digital video cameras are useful in both consumer and professional contexts. Generally, digital video cameras capture sequences of digital images, which may then be transferred to a computer system for display or processing or to a storage device for storage. Alternatively, digital still cameras may be employed to capture distinct, non-video digital images.

In some applications, stereo cameras may be employed to generate synthetic virtual images from a variety of viewpoints. For example, in video conferencing application, a single video camera can capture images of a conference participant. However, the participant's gaze tends to align with a display window presented in a monitor by the video conferencing system, while the video camera is typically mounted to the side of or above or below the display window, resulting in a misalignment between the participant's gaze and the captured video (e.g., capturing images of the side of the participant's head rather than a "straight-on" view). Accordingly, virtual images of straight-on, cyclopean views may be synthesized from stereo images captured by stereo cameras that are offset relative to the display window. It should be understood that other applications of virtual image generation may be employed outside the field of video conferencing.

However, existing methods of synthesizing cyclopean virtual images from stereo images often produce artifacts (e.g., streaks, blocks, and halos) that diminish the quality of the resulting virtual images. For example, an exemplary type of artifact results from mismatched mixes of foreground and background colors in corresponding pixels of stereo images. Because of the pixel disparities introduced by the relative positions and angles of the stereo cameras, it is common that the background colors contributing to the color mixing in one pixel of one stereo image are different from the background colors contributing to the color mixing in a corresponding pixel of another stereo image. A result of this color mixing difference is a tendency to inaccurately synthesize a virtual image pixel where color mixing discrepancies exists, thereby introducing incorrect transparency effects, streaking, and aliasing into the resulting virtual image.

SUMMARY

Implementations described and claimed herein address the foregoing problems by detecting the artifacts in a virtual image generated from stereo images. A disparity map is generated from the stereo images, and individual projected images are determined based on the disparity map and the corresponding stereo images. A difference map is then computed between the individual projected images to indicate the artifacts.

Having detected an artifact in the virtual image, a source patch in the virtual image is defined relative to the artifact. A target patch is generated using a split-patch search technique as a composite of a background exemplar patch and a foreground exemplar patch. Each exemplar patch may be identified from an image patch selected from at least one of the input stereo images. The source patch of the virtual image is replaced with the target patch to correct the detected artifact.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

The computer program product encodes a computer program for a computer process executing on a computer system. The computer process corrects an artifact in a virtual image synthesized from stereo images. An artifact is detected in the virtual image based on a disparity map of the stereo images. A source patch is designated relative to the artifact in the virtual image. A target patch is generated as a composite of a background exemplar patch and a foreground exemplar patch, each exemplar patch being identified from an image patch from at least one of the stereo images. The source patch of the virtual image is replaced with the target patch.

In another implementation, a method is provided that corrects an artifact in a virtual image synthesized from stereo images. An artifact is detected in the virtual image based on a disparity map of the stereo images. A source patch is designated relative to the artifact in the virtual image. A target patch is generated as a composite of a background exemplar patch and a foreground exemplar patch, each exemplar patch being identified from an image patch from at least one of the stereo images. The source patch of the virtual image is replaced with the target patch.

In another implementation, a system for correcting an artifact in a cyclopean virtual image synthesized from stereo images is provided. An artifact correction module detects the artifact in the virtual image based on a disparity map of the stereo images. The module designates a source patch relative to the artifact in the virtual image. The module also generates a target patch as a composite of a background exemplar patch and a foreground exemplar patch and replaces the source patch of the virtual image with the target patch.

Other implementations are also described and recited herein.

DETAILED DESCRIPTION

Figure 1:
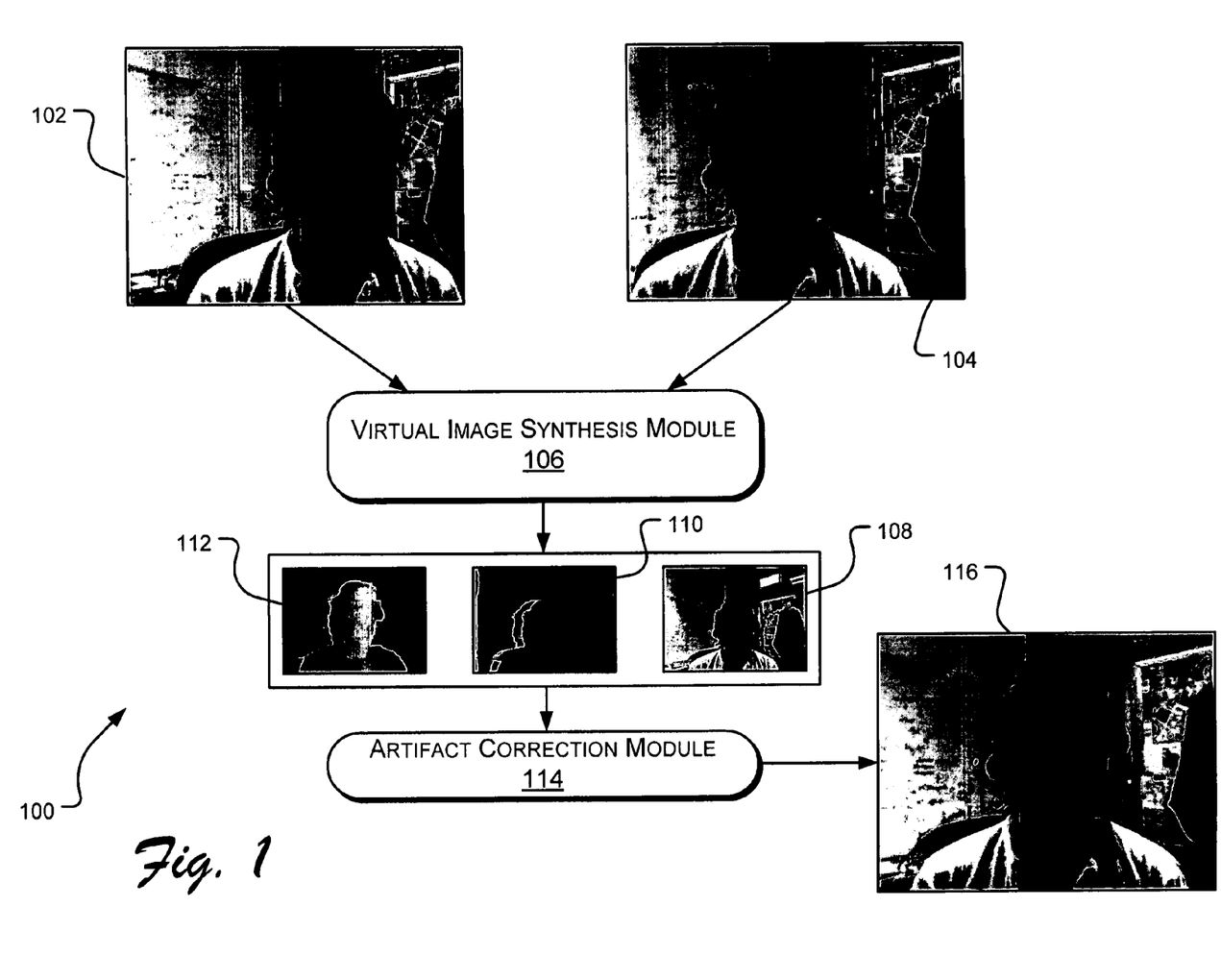
FIG. 1 illustrates an exemplary artifact-correcting virtual image generation system.

FIG. 1 illustrates an exemplary artifact-correcting virtual image generation system 100. In the system 100, a left image 102 is captured by a camera mounted on the right side of the video display, as seen by the user. Likewise, a right image 104 is captured by a camera mounted on the left side of the video display, as seen by the user. As such, in both images, the user can be seen looking into the video display, as opposed to looking directly at one of the cameras. The left and right images 102 and 104 are input to a virtual image synthesis module 106, which generates from the images 102 and 104 a virtual image 108 with gaze correction. The virtual image synthesis module 106 may also generate an occlusion map 110 and a stereo disparity map 112, as shown in FIG. 1. Exemplary methods of synthesizing virtual images from stereo images are described in previously-incorporated application U.S. Pat. No. 10/763,453, entitled "Virtual Camera Translation".

The virtual image 108, the occlusion map 110, and the stereo disparity map 112 generated by the virtual image synthesis module 106 are input to an artifact correction module 114 to generate the virtual image 116 with gaze correction and artifact correction. As a result, the virtual image 116 depicts a high-quality image of the user appearing to look directly into the camera.

Figure 2:
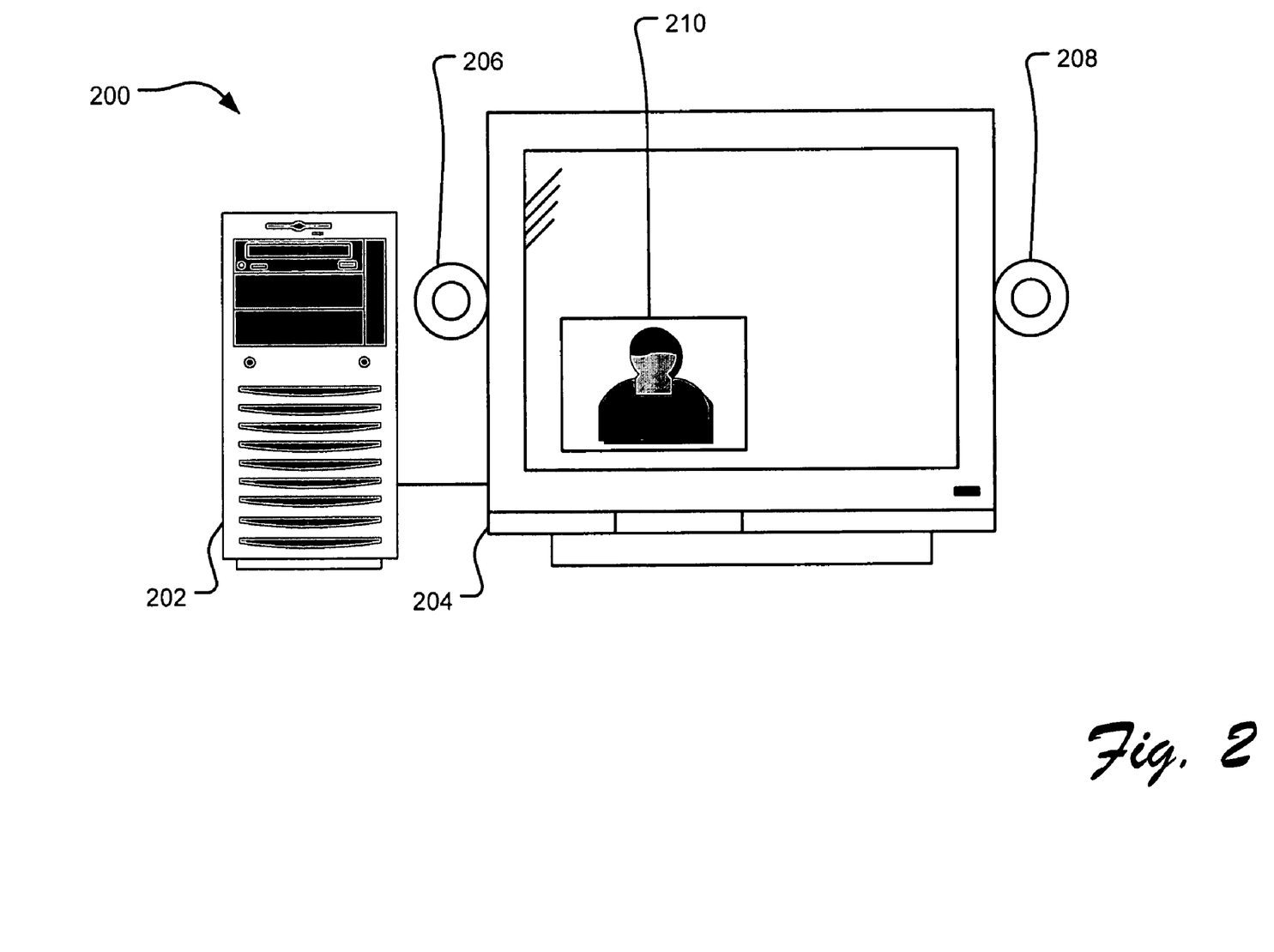
FIG. 2 illustrates an exemplary video conferencing system configuration for generating an artifact-corrected virtual image.

FIG. 2 illustrates an exemplary video conferencing system 200 configuration for generating an artifact-corrected virtual image. A computer system 202 is coupled to a video display 204 having two cameras 206 and 208 mounted on either side of the video display 204. It should be understood that other stereo placements of the cameras 206 and 208 (e.g., top/bottom, a four-camera configuration at each corner, etc.). A video window 210 displays a remote participant on the other end of the video conference session.

In a configuration having only a single camera, the user typically focuses his or her eyes on the video window 210, while the single camera captures images of the user from one side or the other. As such, the captured images sent to the remote participant are primarily a side view of the user's head, not the desired straight-on view of the user's face. The illustrated configuration, however, allows synthesis of a cyclopean virtual image from the captured left and right images of the user. It should be understood that cyclopean refers to the single virtual image. Furthermore, in one implementation, the cyclopean virtual image may be displayed at different video window locations on the display screen (i.e., cyclopean virtual image location is not limited to a central orientation relative to the stereo cameras) while maintaining alignment of the virtual camera with the user's gaze. Likewise, axial translation of the virtual image may also be achieved in an implementation.

It should be understood that more than two cameras may also be used to generate a cyclopean virtual image. Likewise, the cameras may be in alternative orientations, such as at the top and bottom of the video display. For example, one configuration may include four cameras, each placed at a corner of the video display.

Figure 3:
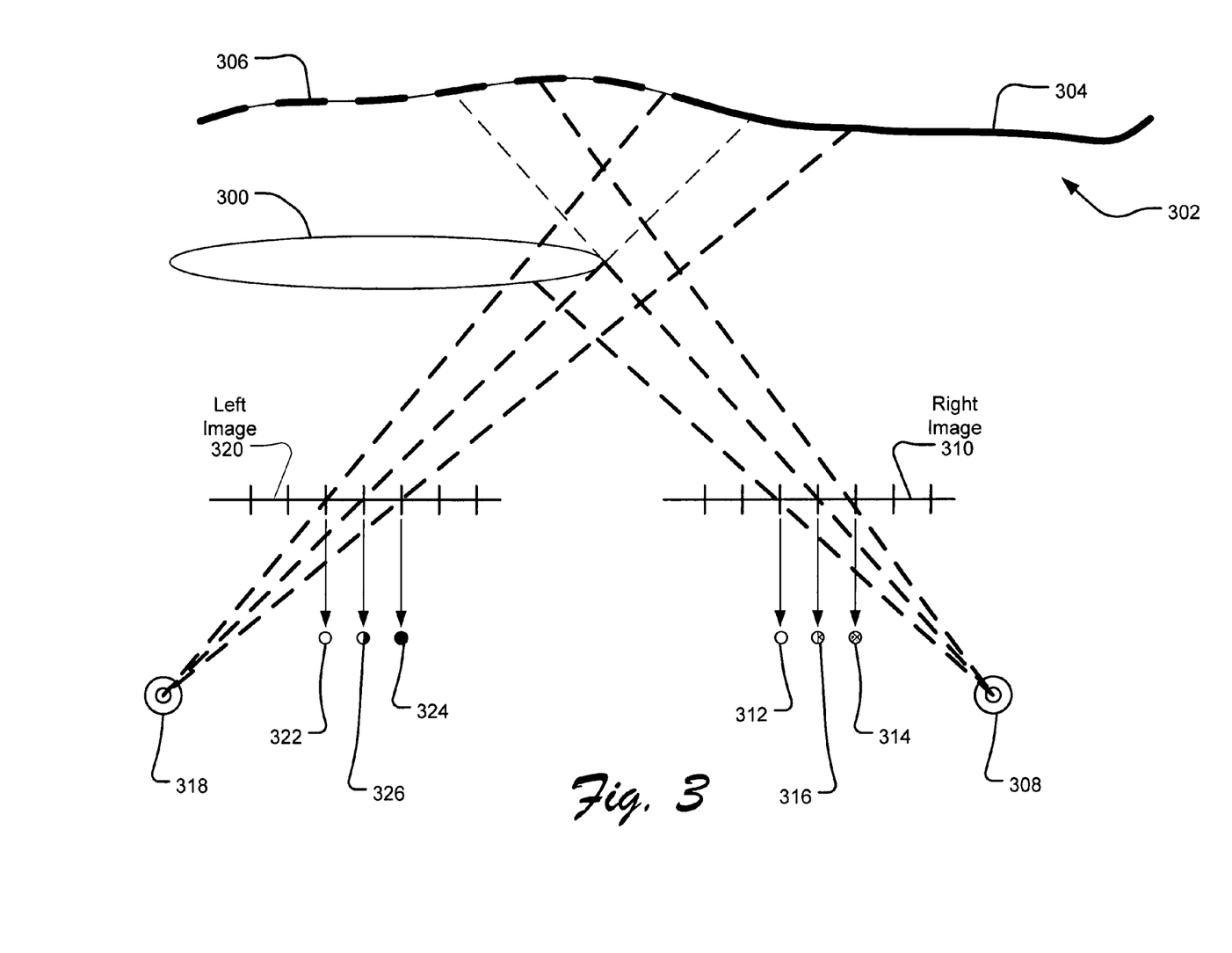
FIG. 3 illustrates a cause of color mixing discrepancies in corresponding pixels of stereo images.

FIG. 3 illustrates a cause of color mixing discrepancies in corresponding pixels of stereo images. A foreground object 300 is shown against a multi-color background 302, where the solid line 304 represents one color A and the broken line 306 represents another color B, and both background colors differ from the color of the foreground object.

A right camera 308 captures a right image 310 that includes a pixel 312 having color of the foreground object, a pixel 314 having the color of the background B, and a pixel 316 having a color mix of the foreground object and the background B. A left camera 318 captures a left image 320 that includes a pixel 322 having color of the foreground object, a pixel 324 having the color of the background A, and a pixel 326 having a color mix of the foreground object and the background A. As discussed, the different color mixes of the corresponding pixels 316 and 326 may produce artifacts caused by mismatching the pixels during the virtual image synthesis process (e.g., generation of the disparity map is inaccurate because pixel 316 is not matched with pixel 326 because of the color mixing difference).

Figure 4:
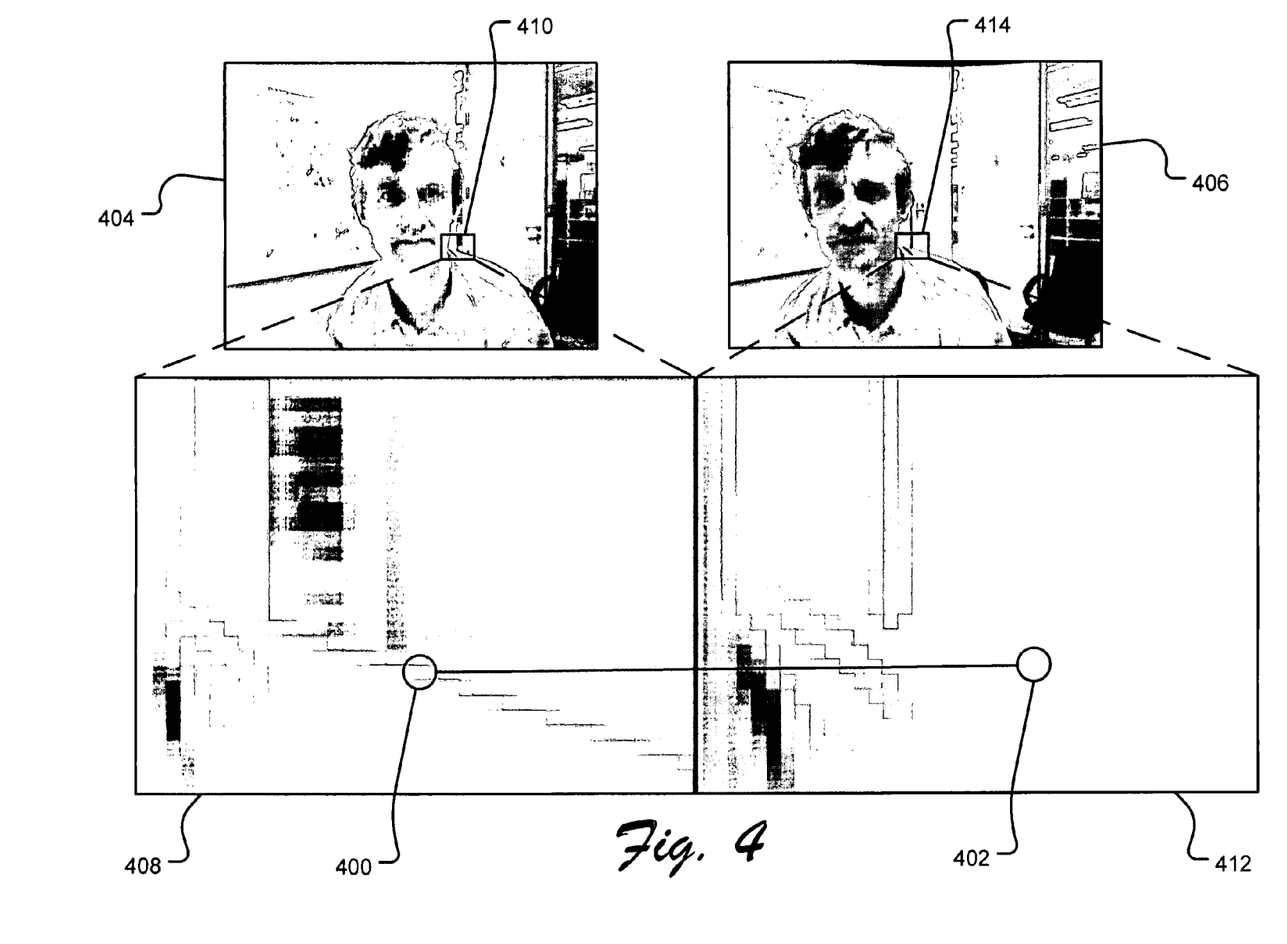
FIG. 4 illustrates a color mixing discrepancy in corresponding pixels of stereo images.

FIG. 4 illustrates a color mixing discrepancy in corresponding pixels 400 and 402 of stereo images 404 (left) and 406 (right). An image 408 represents a magnified version of region 410 of left image 404, and an image 412 represents a magnified version of region 414 of right image 406. As is evident from the magnified images 408 and 412, the corresponding pixels 400 and 402 include colors of the subject's shoulder and colors of the background. However, a dark brown door provides the background color contribution in the pixel 400 while a light tan wall provides the background color contribution in the pixel 402. As a result, the colors of the corresponding pixels 400 and 402 are different.

When generating a virtual image pixel corresponding to the pixels 400 and 402, the color mixing discrepancy between the two pixels can result in a mismatch as a disparity graph is generated along the epipolar lines associated with the two pixels. Color mixing mismatches typically result in artifacts in the virtual image (e.g., artifacts 500 in FIG. 5). However, such artifacts can be detected and corrected (e.g., reduced) using techniques described herein.

Figure 5:
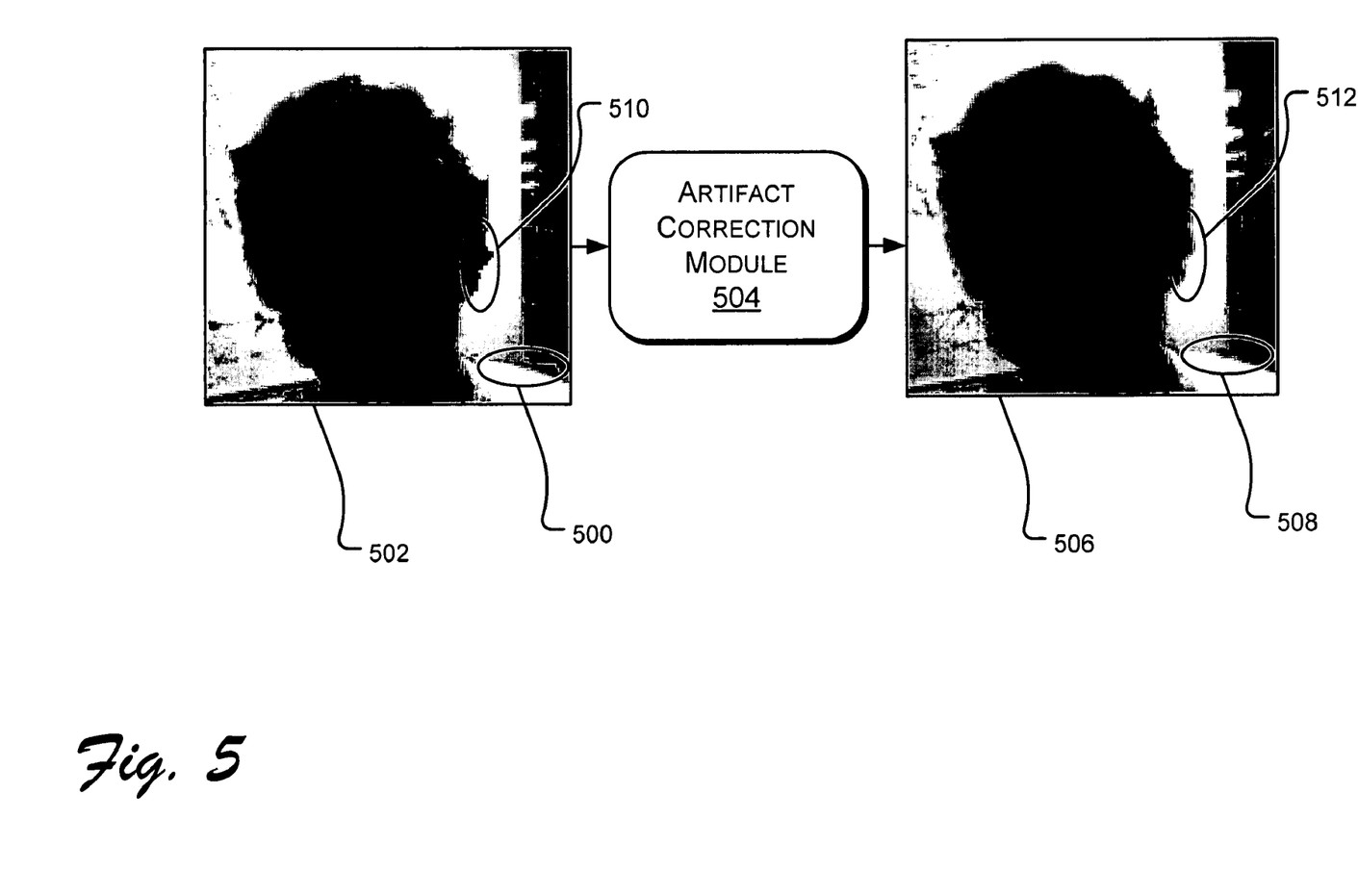
FIG. 5 depicts an exemplary system for removing artifacts from a virtual image.

FIG. 5 depicts an exemplary system for removing artifacts 500 from a virtual image 502. The artifacts 500 result from color mixing mismatches, such as the mismatch illustrated in FIG. 4. An artifact correction module 504 corrects the artifacts to provide a more suitable result image 506, in which the corresponding corrected region 508 shows dramatically reduced artifact effects. Other artifact regions in the images also show improved results (see regions 510 and 512).

Figure 6:
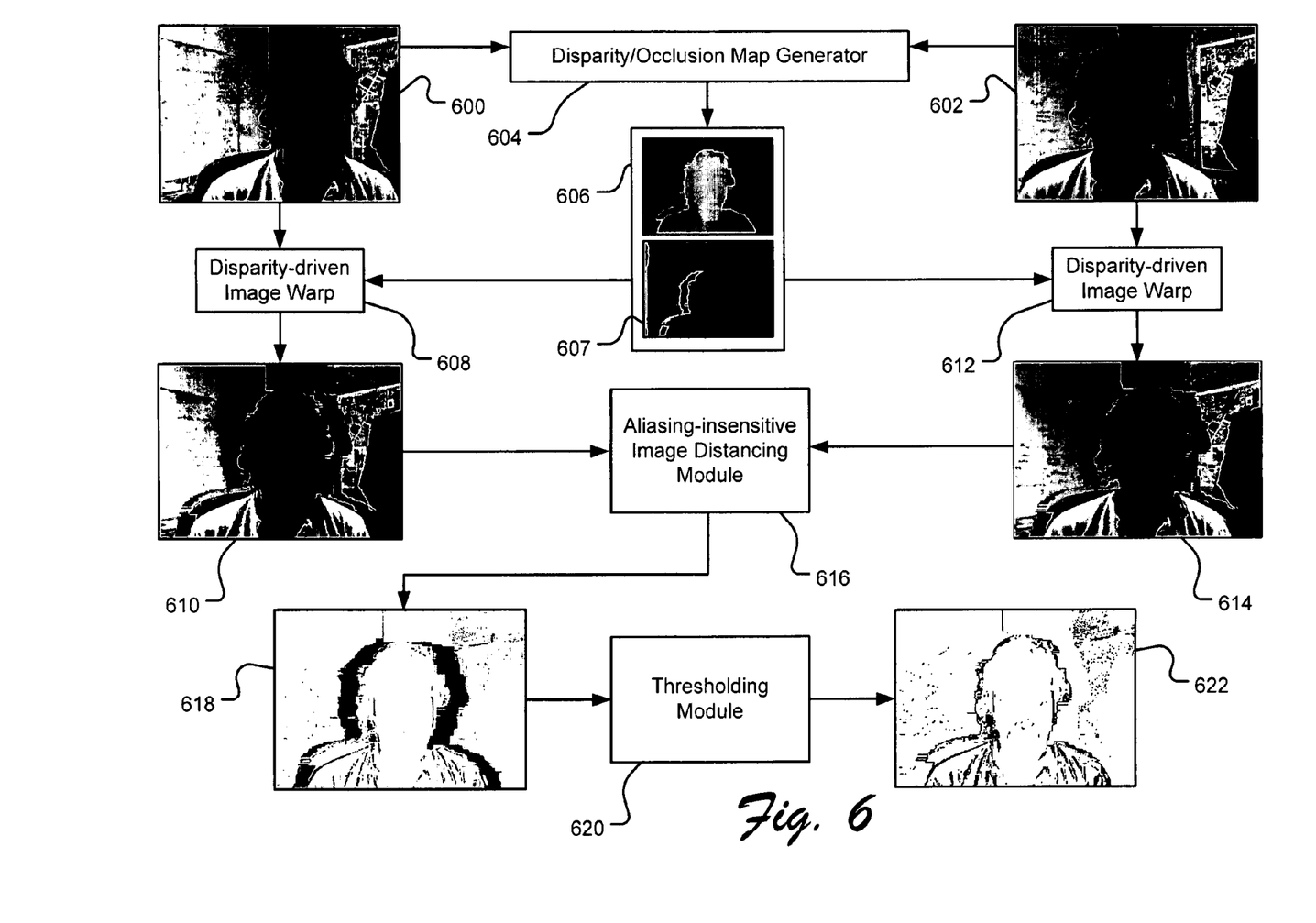
FIG. 6 depicts operations in an exemplary artifact detection process.

FIG. 6 depicts operations in an exemplary artifact detection process. In the illustrated implementation, a left image 600 (denoted as $I_l$) and a right image 602 (denoted as $I_r$) are processed (e.g., "epipolar-rectified") by a disparity map generator 604 to generate from the two images a stereo disparity map 606 (denoted as D) and an occlusion map 607 (denoted as O). A couple of techniques for generating cyclopean virtual images from stereo images are described in previously incorporated U.S. Pat. No. 10/763,453, entitled "Virtual Camera Translation", although other techniques may be used. The disparity map D is generated with respect to the coordinate system defined by the desired virtual viewpoint (e.g., the desired location of the virtual camera, such as the display window of a video conferencing system). A rough virtual image I (not shown) also generated from images $I_l$ and $I_r$ by techniques described in the previously incorporated U.S. Pat. No. 10/763,453, entitled "Virtual Camera Translation" or any other known or equivalent method. The rough virtual image I includes artifacts, such those artifacts introduced by color mixing mismatches.

The left image 600, the disparity map 606, and the occlusion map 607 are input to a disparity-driven image warp module 608 to generate a projected left image 610 with occlusion regions (i.e., the solid light grey and solid dark grey regions to the left and right of the subject). Likewise, the right image 602, the disparity map 606, and the occlusion map 607 are input to a disparity-driven image warp module 612 to generate a projected right image 614 with occlusion regions. It should be understood that modules 608 and 612 are illustrated as distinct modules but could be implemented as the same module taking different inputs (e.g., left and right images). The projected images 610 and 614 (denoted as $I_l^w$ for the projected left image and $I_r^w$ for the right projected right image) represent projections of the corresponding (e.g., left or right) images into a target viewpoint. The light grey and dark grey regions represent left and right half-occlusions.

A pixel-wise color distance $d(I_l^w, I_r^w)$ between the two projected images is computed by an aliasing-insensitive image distancing module 616 to indicate the location and entity of artifacts, as shown in the difference map 618. In one implementation, artifacts are represented as:

the set $A$ of pixels $p \epsilon I$ such that $d(I_l^w, I_r^w) > \lambda$ (e.g., $\lambda$=5).

Therefore, the image noise of the difference map 618 may be filtered (e.g., $d(I_l^w, I_r^w) > \lambda$), for example, by a thresholding module 620, to generate an artifact map 622. Assuming low levels of image noise, large values of $d(I_l^w, I_r^w)$ in the artifact map 622 occur in pixel locations where the virtual image synthesis algorithm has failed to correctly estimate the correct pixel correspondence between the two images $I_l$ and $I_r$ (e.g., because of color mixing mismatches or other matching errors).

Figure 7:
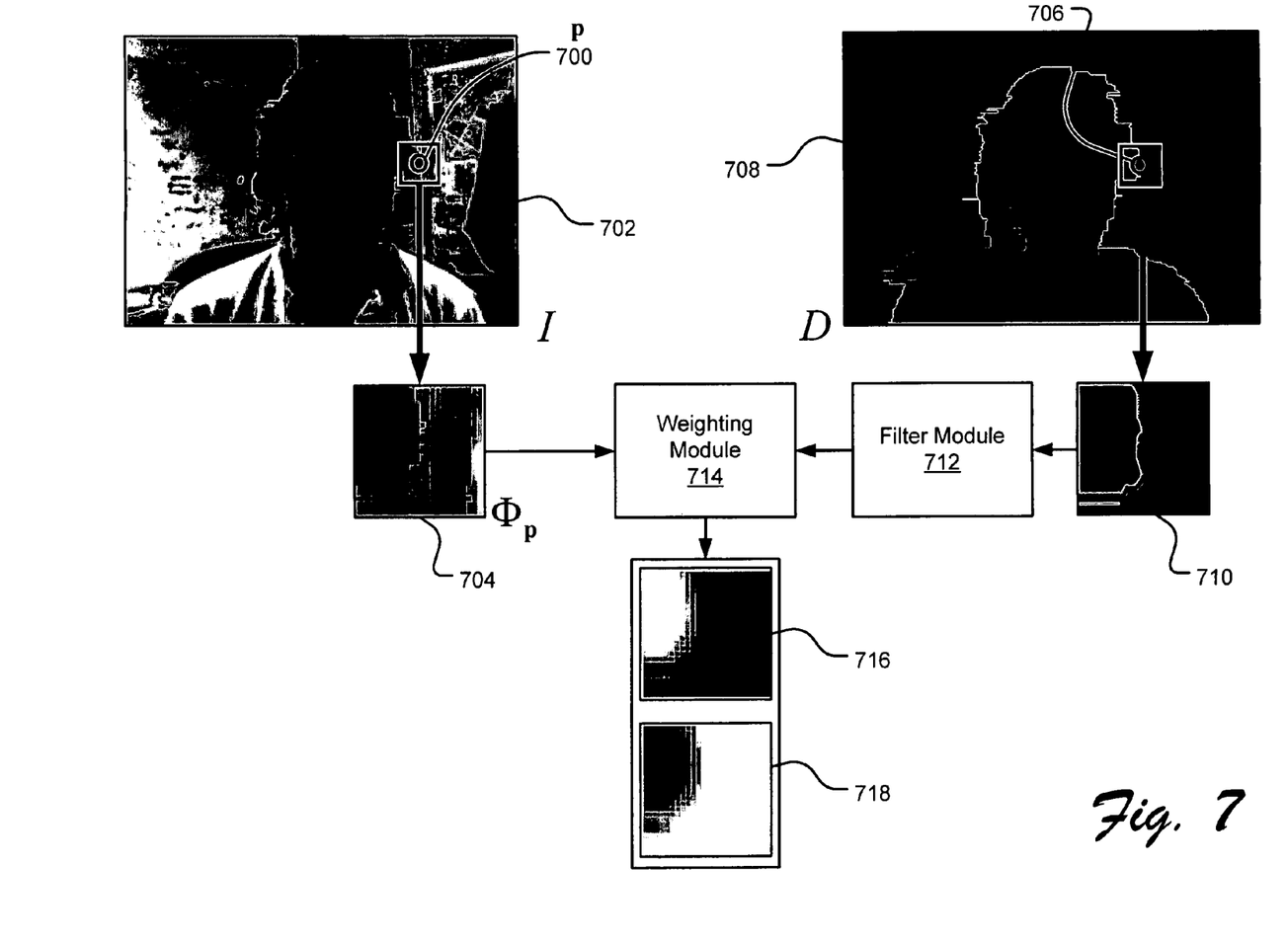
FIG. 7 illustrates splitting a virtual image patch into foreground and background components based on a disparity map in an exemplary implementation.

FIG. 7 illustrates splitting a virtual image patch into foreground and background filter components based on a disparity map in an exemplary implementation. As discussed, the artifact map 622 of FIG. 6 indicates pixel locations of artifacts in the rough virtual image generated by a virtual image synthesis module. By virtue of the virtual image synthesis, a rough virtual image I, a disparity map D, and a set A of artifacts are available as inputs to an artifact correction operation.

For each pixel $p \epsilon A$, a source patch $\Phi_p$ centered at p is defined. For example, a source patch may include a set of neighboring pixels, such as a square region that is 5 pixels wide and 5 pixels high and centered at p. In the illustration, larger patches are shown to assist in the description. An artifact correction operation searches for a new target patch $\psi_p$ with which to replace the source patch $\Phi_p$. The new target patch $\psi_p$ will be similar to the source patch $\Phi_p$ but with the artifacts removed. Replacing a source patch $\Phi_p$ with a new target patch $\psi_p$ for all pixels p removes detected artifacts throughout the entire image.

In FIG. 7, an artifact point 700 (denoted as p) in a rough virtual image 702 (denoted as I) is selected. A source patch 704 (denoted as $\Phi_p$) relative to the artifact 700 is defined in the rough virtual image 702. A disparity point 706 (denoted again as p, because its location corresponds to the location of point 700) in a disparity map 708 (denoted as D) is identified as corresponding to the pixel p in the rough virtual image 702. A corresponding disparity patch 710 (denoted as $D_p$) is also identified. The disparity patch 710 is smoothed by a filter module 712 to provide a filtered disparity patch $\tilde{D}_p$ (not shown). By filtering the patch (e.g., by performing a low-pass smoothing operation on the patch), high frequency components of the disparity signal, which often arise from matching mistakes, are removed. Given these inputs, a foreground weight array $\Omega_p^f$ and a background weight array $\Omega_p^b$ may be computed by a weighting module 714 as follows:

$$\Omega_p^f = \frac{\tilde{D}(q) - \tilde{D}^m}{\tilde{D}^M - \tilde{D}^m}; \quad \Omega_p^b = 1 - \Omega_p^f; \quad \forall q \in \Phi_p$$

with $\tilde{D}^m$ and $\tilde{D}^M$ representing the minimum and maximum values respectively of the disparities within the filtered disparity patch $\tilde{D}_p$. A map 716 representing a foreground weighting array, and a map 718 representing a background weighting array are shown as outputs from the weighting module 714. The weighting arrays may also be referred to as "filter maps".

Figure 8:
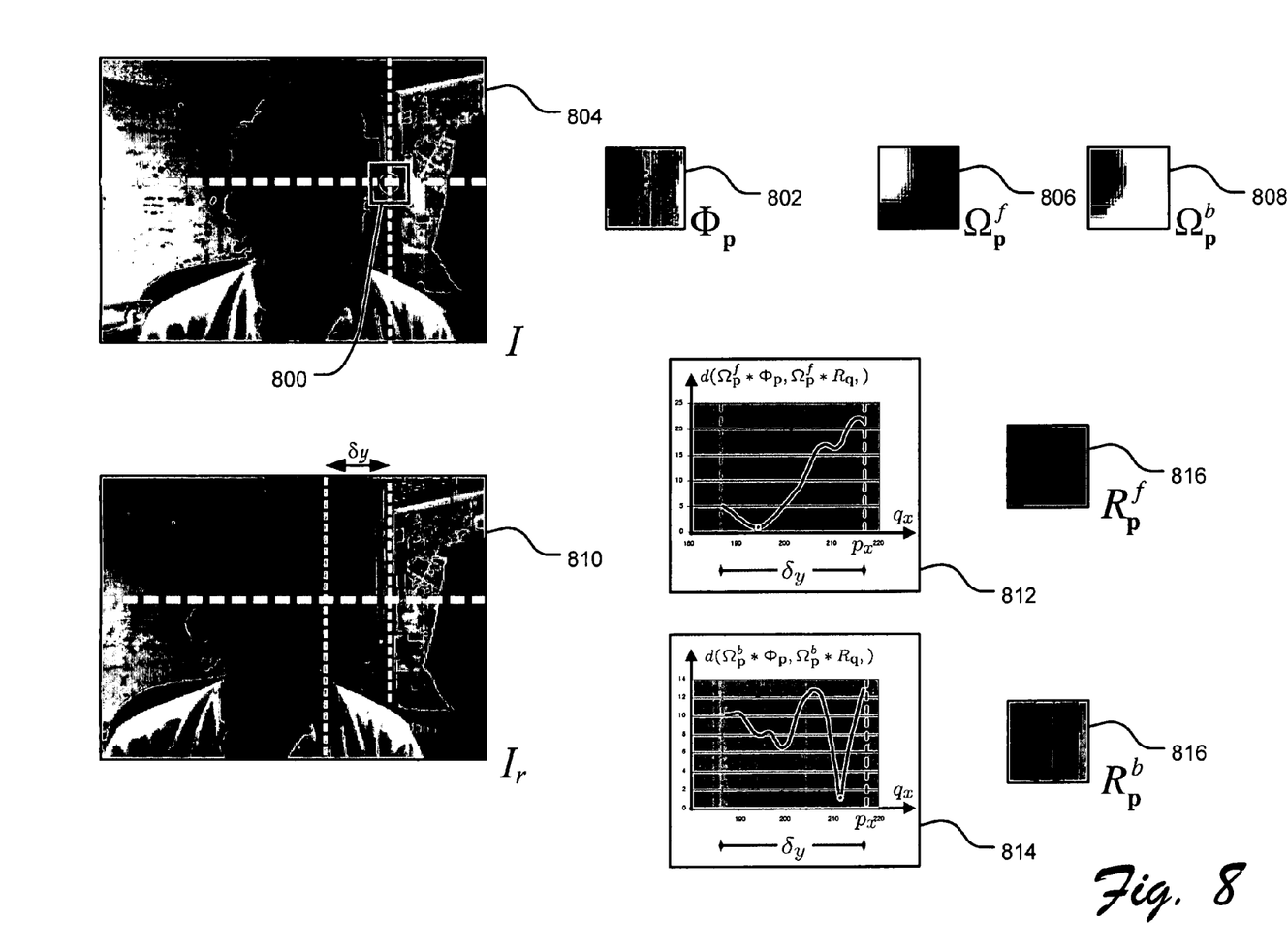
FIG. 8 illustrates an exemplary split-patch search of candidate exemplar patches.

FIG. 8 illustrates an exemplary split-patch search of candidate exemplar patches. The split-patch search searches for patches in the original right and left images that are most similar to the foreground and background portions of the source patch from the virtual image. In one implementation, the search is performed along the scan line (e.g., an epipolar line) corresponding to point p up to a distance $\delta y$ in each of the original images. An exemplary value of $\delta y$ may be computed as follows:

$$\delta y = \max_{q \in I | q_y = y} \frac{\tilde{D}(q)}{2}$$

An artifact and a corresponding source patch 800 (shown in exploded view 802 and denoted as $\Phi_p$) are selected from a rough virtual image 804. In the illustrated implementation, the artifact is detected by operations described with regard to FIG. 6, although other artifact detection methods may be employed. A foreground filter 806 (denoted as $\Omega_p^f$) is used in combination with the source patch 802 and generic left/right-view patches to compute candidate foreground exemplar patches $R_p^f$ and $L_p^f$. Likewise, background filter 806 (denoted as $\Omega_p^b$) is used in combination with the source patch 802 and generic left/right-view patches to compute candidate background exemplar patches $R_p^b$ and $L_p^b$.

Choosing the right image 810 to exemplify split-patch search operations, generic patches along the epipolar line that includes the pixel p in the right image are evaluated against the source patch, as modified by the foreground and background filters (see the equations below), to identify the candidate exemplar patches. Selecting the minimum difference between the pixel-wise parameters below (e.g., $\Omega_p^f * \Phi_p$ and $\Omega_p^f * R_q$) represents one exemplary implementation of such a split-patch search. The graphs 812 and 814 illustrate the evaluations used to select the candidate exemplar patches 816 (foreground) and 818 (background) from the right image 810. The process is repeated for the left image (not shown)

Algorithmically, given appropriate search constraints, candidate exemplar patches may be determined as follows:

$$R_p^f = \arg\min_{p_x - \delta_y \leq q_x \leq p_x} d(\Omega_p^f * \Phi_p, \Omega_p^f * R_q)$$

$$R_p^b = \arg\min_{p_x - \delta_y \leq q_x \leq p_x} d(\Omega_p^b * \Phi_p, \Omega_p^b * R_q)$$

$$L_p^f = \arg\min_{p_x \leq q_x \leq p_x + \delta_y} d(\Omega_p^f * \Phi_p, \Omega_p^f * L_q)$$

$$L_p^b = \arg\min_{p_x \leq q_x \leq p_x + \delta_y} d(\Omega_p^b * \Phi_p, \Omega_p^b * L_q)$$

with $L_q$ and $R_q$ representing the generic left and right view patches centered at the generic point $q|q_y=p_y$, along the epipolar line. The symbol "*" represents point-wise multiplication between images (or patches). In one implementation, the distance $d(\Pi_1, \Pi_2)$ between two generic patches $\Pi_1$ and $\Pi_2$ is represented as the sum of squared differences (SSD) of pixel values, where the pixels of A are ignored.

Figure 9:
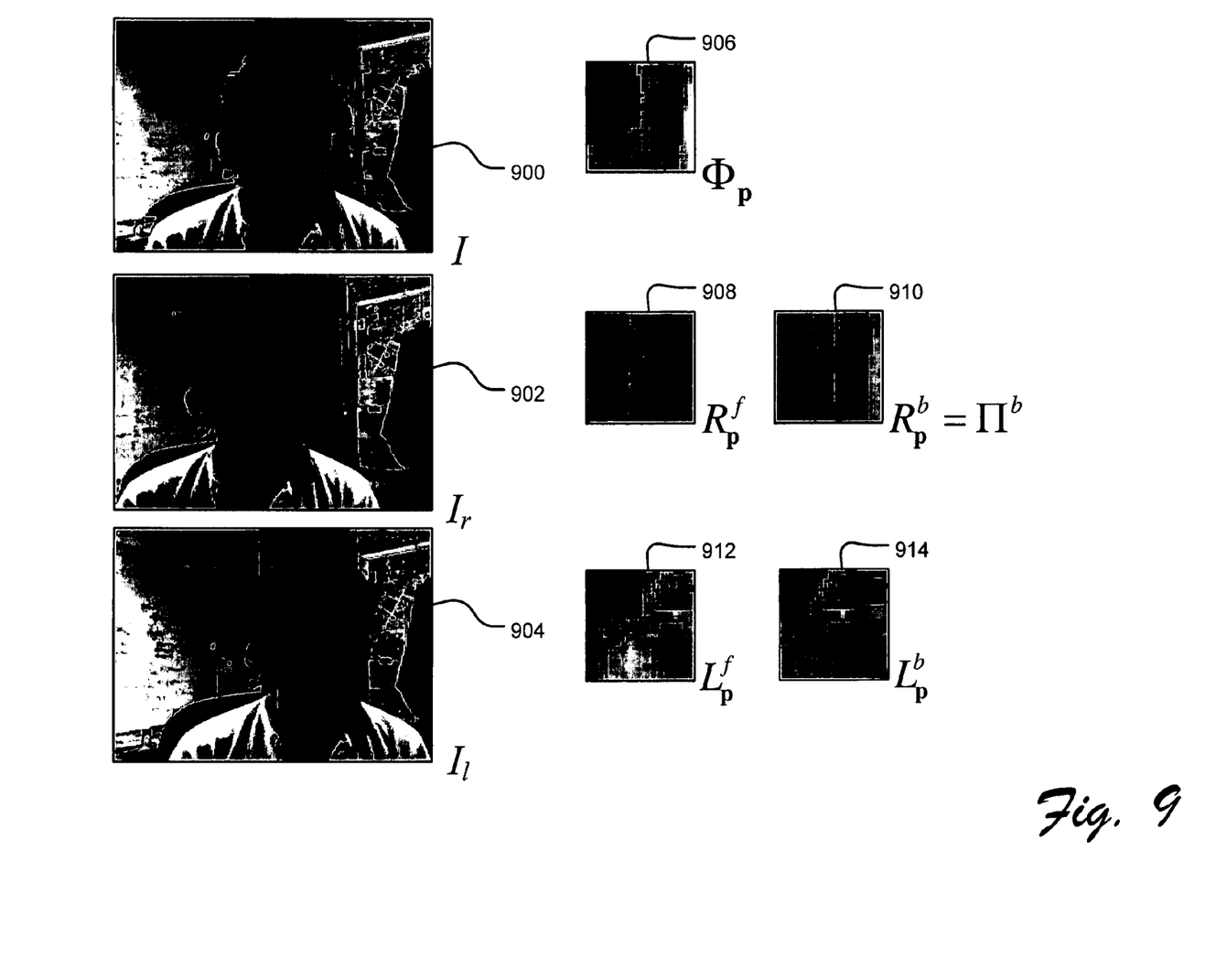
FIG. 9 illustrates results of an exemplary selection of candidate exemplar patches.

FIG. 9 illustrates results of an exemplary selection of candidate exemplar patches. A rough virtual image 900, a right image 902, and a left image 904 are processed in a manner described with regard to FIG. 8, resulting in a source patch 906, a right candidate foreground exemplar patch 908, a right candidate background exemplar patch 910, a left candidate foreground exemplar patch 912, and a left candidate background exemplar patch 914. These resulting candidate exemplar patches are considered "candidates" because occlusion can render one of the background candidate exemplar patches meaningless. Indeed, the true background patch of $\Phi_p$ has been occluded in the left view, thus the retrieved patch $L_p^b$ is meaningless. In contrast, the right candidate background exemplar patch $R_p^b$ contains the correct background information.

Determining an uncontaminated background exemplar patch $\Pi_p^b$ may be performed automatically by selecting the background patch that is most similar to the background of the source patch 906, using:

$$\Pi_p^b = \arg\min_{\Lambda \in \{L,R\}} d(\Omega_p^b * \Lambda_p^b, \Omega_p^b * \Phi_p)$$

The uncontaminated background exemplar patch $\Pi_p^b$ is one component used to generate a new composite target patch $\psi_p$. In addition, candidate exemplar foreground patches $R_p^f$ and $L_p^f$ have been already determined for each pixel $p \in A$. An effective algorithm for compositing a target patch $\psi_p$ may be stated as:

$$\psi_p = \Gamma_p * \Pi_p^f + (1 - \Gamma_p) * \Pi_p^b \quad (1)$$

where $\Gamma_p$ represents the transparency of the pixel p, $\Pi_p^f$ represents the uncontaminated foreground exemplar patch about the pixel p, and $\Pi_p^b$ represents the uncontaminated background exemplar patch about the pixel p. However, $\Pi_p^f$ has not yet been computed and, in fact, an exact solution for $\Pi_p^f$ does not appear available. As such, reasonable approximations are employed in one implementation.

The candidate exemplar foreground patch $L_p^f$ may be interpreted itself as a composite image. Its background (i.e., the poster on the back wall) is completely visible in the right input view $I_r$. The background of $L_p^f$ can be extracted by the following search process:

$$\hat{L}_p^b = \arg\min_{p_x \leq q_x \leq p_x + \delta_y} d(\Omega_p^b * L_p^f, \Omega_p^b * R_q)$$

The analogous background $\hat{R}_p^b$ corresponding to the right foreground patch $R_p$ is occluded by the subject's head and therefore cannot be copied directly from either of the two input views. For example, in FIG. 10, the background of the right patch $R_p^f$ 1000 centered at point p (i.e., point 1002) is, of course, occluded in part by the foreground of the right image $I_r$ 1004. Furthermore, the background of the right patch $R_p^f$ 1000 cannot be found along the scan line 1006 of the left image 1008. Accordingly, an approximation of $\hat{R}_p^b$ is computed by one of a variety of methods.

Figure 10:
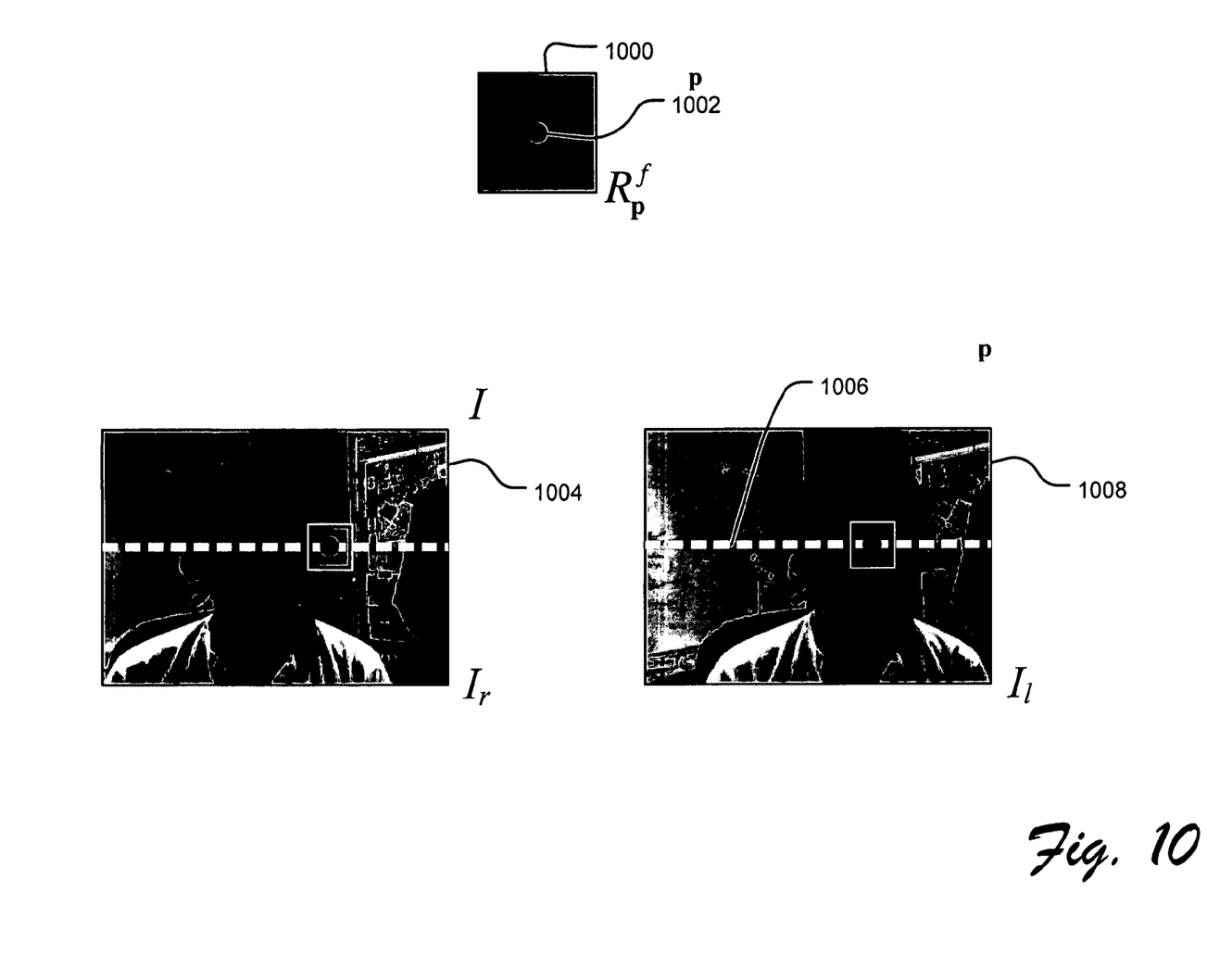
FIG. 10 illustrates exemplary occlusion of a background region of a patch.

An exemplary method of approximating $\hat{R}_p^b$ may be implemented as follows. Given the right foreground patch $R_p^f$ and the background filter $\Omega_p^b$, pixels of $R_p^f$ that belong to the background (i.e., the door in the example image) are extracted and a parametric surface model is fit (e.g., polynomial, spline, etc.) to the corresponding color values in RGB space. Then, the fitted surface model is used to extrapolate the colors of the pixels in the occluded portion of $R_p^f$ (i.e., behind the hair in the example). In one implementation applied to small patches (e.g., 5 pixels by 5 pixels), extrapolation via a generic planar fit (generally not constant) has produced acceptable results. Symmetrical reasoning is applied when $\hat{L}_p^b$ is occluded.

Based on the approximation operation, two foreground patches ($L_p^f$ and $R_p^f$) and two corresponding background patches ($\hat{L}_p^b$ and $\hat{R}_p^b$) have been extracted. Therefore, the conventional compositing equation may be stated for each candidate foreground exemplar patch:

$$L_p^f = \Gamma_p * \Pi_p^f + (1 - \Gamma_p) * \hat{L}_p^b \quad (2)$$

$$R_p^f = \Gamma_p * \Pi_p^f + (1 - \Gamma_p) * \hat{R}_p^b \quad (3)$$

with $\Gamma_p$ representing the transparencies and $\Pi_p^f$ representing the uncontaminated foreground colors. Given that both background patches ($\hat{L}_p^b$ and $\hat{R}_p^b$) are known, then both $\Gamma_p$ and $\Pi_p^f$ may now be uniquely determined from Equations (2) and (3). Transparencies may be assumed to apply equally to each of the RGB channels.

Noise and coincidently similar colors shared by corresponding pixels can corrupt the accurate recovery of transparencies and foreground colors. However, such recovery can be improved through incorporation of prior information (e.g., on the distribution of alpha (i.e., transparency) and color value). In one implementation, a Bayesian approach may be applied to regularize the alpha and color data. Alternative approaches are also available, including filtering the extracted alpha and color data in a depth-dependent fashion.

As a result, given the foreground exemplar patch $\Pi_p^f$, the transparency $\Gamma_p$, and the background $\Pi_p^b$, the target patch may be computed according to Equation (1).

Figure 11:
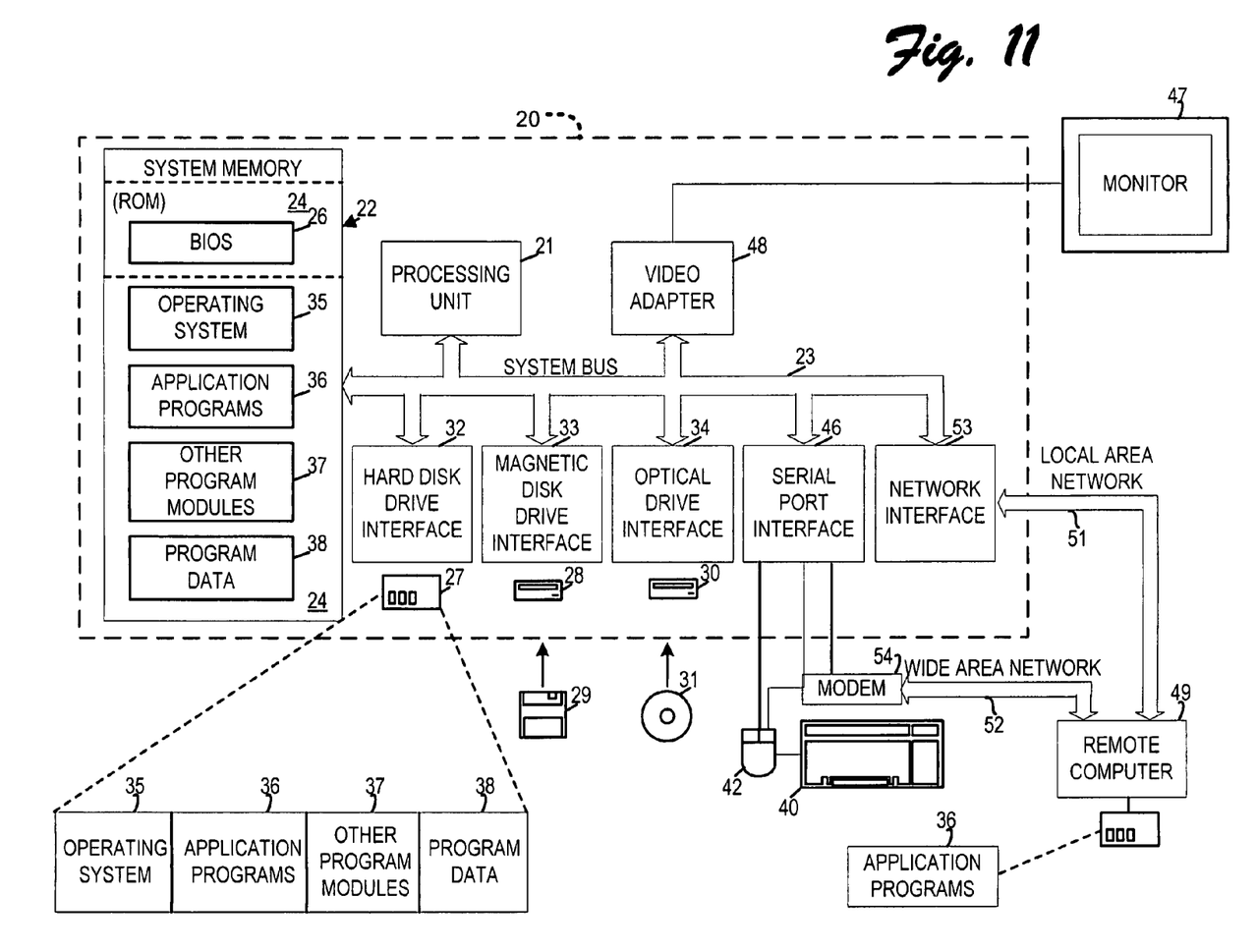
FIG. 11 illustrates a system useful for implementing an embodiment of the present invention.

The exemplary hardware and operating environment of FIG. 11 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 11. The logical connections depicted in FIG. 11 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a virtual image synthesis module, an artifact removal module, an image distancing module, a disparity/occlusion map generator, and other modules may be incorporated as part of the operating system 35, application programs 36, or other program modules 37. Virtual image data, image data, image color distances, map data, and other data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method of correcting an artifact in a virtual image synthesized from stereo images, the method comprising:
   detecting the artifact in the virtual image based on a disparity map of the stereo images;
   designating a source patch relative to the artifact in the virtual image;
   generating a target patch as a composite of a background exemplar patch and a foreground exemplar patch, each exemplar patch being identified from an image patch from at least one of the stereo images; and
   replacing the source patch of the virtual image with the target patch.

2. The method of claim 1 wherein the virtual image includes a cyclopean virtual image.

3. The method of claim 1 further comprising:
   identifying a disparity point in the disparity map that corresponds to the artifact pixel;
   defining a disparity patch relative to the disparity point in the disparity map; and
   generating a filter map from the source patch and the disparity patch.

4. The method of claim 3 wherein the filter map represents a foreground filter map.

5. The method of claim 3 wherein the filter map represents a background filter map.

6. The method of claim 3 further comprising:
filtering the disparity patch before generating the filter map.

7. The method of claim 1 further comprising:
generating a filter map from a source patch of the virtual image and a disparity patch of the disparity map;
determining a candidate exemplar patch from each stereo image based on the filter map.

8. The method of claim 7 wherein the filter map represents a background filter map and further comprising:
filtering the source patch using the background filter map; and
selecting one of the candidate exemplar patches as the background exemplar patch based on comparison to the background-filtered source patch.

9. The method of claim 7 further comprising:
extracting an unoccluded background exemplar patch from an unoccluded foreground candidate exemplar patch;
approximating an occluded background exemplar patch from an occluded foreground candidate exemplar patch; and
determining the foreground exemplar patch from the unoccluded background exemplar patch and the occluded background exemplar patch.

10. The method of claim 9 further comprising:
determining a transparency weight from the unoccluded background exemplar patch and the occluded background exemplar patch.

11. The method of claim 1 wherein the generating operation comprises:
generating a target patch as a weighted average of a background exemplar patch and a foreground exemplar patch, based on a transparency weight.

12. A computer program product encoding a computer program for executing on a computer system a computer process for correcting an artifact in a virtual image synthesized from stereo images, the computer process comprising:
detecting the artifact in the virtual image based on a disparity map of the stereo images;
designating a source patch relative to the artifact in the virtual image;
generating a target patch as a composite of a background exemplar patch and a foreground exemplar patch, each exemplar patch being identified from an image patch from at least one of the stereo images; and
replacing the source patch of the virtual image with the target patch.

13. The computer program product of claim 12 wherein the virtual image includes a cyclopean virtual image.

14. The computer program product of claim 12 wherein the computer process further comprises:
identifying a disparity point in the disparity map that corresponds to the artifact pixel;
defining a disparity patch relative to the disparity point in the disparity map; and
generating a filter map from the source patch and the disparity patch.

15. The computer program product of claim 14 wherein the filter map represents a foreground filter map.

16. The computer program product of claim 14 wherein the filter map represents a background filter map.

17. The computer program product of claim 14 wherein the computer process further comprises:
filtering the disparity patch before generating the filter map.

18. The computer program product of claim 12 wherein the computer process further comprises:
generating a filter map from a source patch of the virtual image and a disparity patch of the disparity map;
determining a candidate exemplar patch from each stereo image based on the filter map.

19. The computer program product of claim 18 wherein the filter map represents a background filter map and further comprising:
filtering the source patch using the background filter map; and
selecting one of the candidate exemplar patches as the background exemplar patch based on comparison to the background-filtered source patch.

20. The computer program product of claim 18 wherein the computer process further comprises:
extracting an unoccluded background exemplar patch from an unoccluded foreground candidate exemplar patch;
approximating an occluded background exemplar patch from an occluded foreground candidate exemplar patch; and
determining the foreground exemplar patch from the unoccluded background exemplar patch and the occluded background exemplar patch.

21. The computer program product of claim 20 wherein the computer process further comprises:
determining a transparency weight from the unoccluded background exemplar patch and the occluded background exemplar patch.

22. The computer program product of claim 12 wherein the generating operation comprises:
generating a target patch as a weighted average of a background exemplar patch and a foreground exemplar patch, based on a transparency weight.

23. A system for correcting an artifact in a cyclopean virtual image synthesized from stereo images, the system comprising:
an artifact correction module that detects the artifact in the virtual image based on a disparity map of the stereo images, designates a source patch relative to the artifact in the virtual image, generates a target patch as a composite of a background exemplar patch and a foreground exemplar patch, and replaces the source patch of the virtual image with the target patch.

* * * * *